(12) United States Patent
Ragan et al.

(10) Patent No.: US 11,485,582 B2
(45) Date of Patent: Nov. 1, 2022

(54) MULTI-ANGLE SORTER

(71) Applicant: Laitram, L.L.C., Harahan, LA (US)

(72) Inventors: Bryant G. Ragan, Metairie, LA (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/283,161

(22) PCT Filed: Oct. 16, 2019

(86) PCT No.: PCT/US2019/056488
§ 371 (c)(1),
(2) Date: Apr. 6, 2021

(87) PCT Pub. No.: WO2020/086352
PCT Pub. Date: Apr. 30, 2020

(65) Prior Publication Data
US 2021/0339961 A1    Nov. 4, 2021

Related U.S. Application Data

(60) Provisional application No. 62/748,818, filed on Oct. 22, 2018.

(51) Int. Cl.
*B65G 37/02*    (2006.01)
*B65G 47/53*    (2006.01)
(Continued)

(52) U.S. Cl.
CPC ............. *B65G 37/02* (2013.01); *B65G 23/08* (2013.01); *B65G 23/12* (2013.01); *B65G 23/44* (2013.01);
(Continued)

(58) Field of Classification Search
None
See application file for complete search history.

(56) References Cited

U.S. PATENT DOCUMENTS 2,760,620 A * 8/1956 Hull .................... B65B 43/50
198/478.1
3,302,804 A * 2/1967 Harris ................... B65B 35/54
414/283
(Continued)

FOREIGN PATENT DOCUMENTS

DE    102016015693 A1    6/2018
JP    08198436 A    8/1996
(Continued)

OTHER PUBLICATIONS

European Search Report, European Patent Application No. 19876557.0, dated May 9, 2022, European Patent Office, Munich, Germany.

*Primary Examiner* — Kavel Singh
(74) *Attorney, Agent, or Firm* — James T. Cronvich

(57) ABSTRACT

A multi-angle sorter having an omnidirectionally endless conveyor belt surrounding a polygonal frame to form a belt-frame assembly supported atop a roller drive including multiple pairs of diagonally opposite roller sets. Each pair of roller sets is arranged to drive the belt in a corresponding angular direction. A grid sorter comprises a grid of intersecting conveyor lines composed of multi-angle sorters at the intersections in line with conventional bidirectional conveyors.

20 Claims, 7 Drawing Sheets

(51) Int. Cl.
    *B65G 23/08*     (2006.01)
    *B65G 43/10*     (2006.01)
    *B65G 39/10*     (2006.01)
    *B65G 23/12*     (2006.01)
    *B65G 23/44*     (2006.01)
    *B65G 39/02*     (2006.01)
    *B65G 39/08*     (2006.01)
    *B65G 15/32*     (2006.01)

(52) U.S. Cl.
    CPC .......... *B65G 39/025* (2013.01); *B65G 39/08* (2013.01); *B65G 43/10* (2013.01); *B65G 15/32* (2013.01)

(56) References Cited

U.S. PATENT DOCUMENTS

| | | | | |
|---|---|---|---|---|
| 3,365,083 A * | 1/1968 | Baumann | ............... | A24C 5/391 |
| | | | | 406/182 |
| 4,126,506 A * | 11/1978 | Marosan | ........... | B29D 30/0016 |
| | | | | 425/18 |
| 4,291,797 A * | 9/1981 | Ewertowski | ........... | B23Q 41/02 |
| | | | | 198/465.1 |
| 4,480,738 A * | 11/1984 | Mattson | ............... | B23Q 7/1431 |
| | | | | 198/465.1 |
| 5,372,238 A * | 12/1994 | Bonnet | ................ | B65G 47/684 |
| | | | | 198/455 |
| 6,005,211 A | 12/1999 | Huang et al. | | |
| 6,230,872 B1 | 5/2001 | Huang et al. | | |
| 6,702,121 B2 * | 3/2004 | Linge | ....................... | B07C 5/36 |
| | | | | 198/469.1 |
| 7,682,291 B2 | 3/2010 | Gill et al. | | |
| 8,113,334 B2 | 2/2012 | Layne | | |
| 8,376,118 B2 | 2/2013 | Layne | | |
| 8,479,912 B2 | 7/2013 | Layne | | |
| 9,604,258 B2 | 3/2017 | Layne et al. | | |
| 2008/0169171 A1 | 7/2008 | Itoh et al. | | |
| 2013/0126300 A1 | 5/2013 | Wolkerstorfer et al. | | |
| 2013/0192954 A1 | 8/2013 | Fourney | | |
| 2016/0300291 A1 * | 10/2016 | Carmeli | ............. | G06Q 30/0635 |

FOREIGN PATENT DOCUMENTS

| | | | |
|---|---|---|---|
| KR | 10-0844793 B1 | 7/2008 | |
| KR | 10-1559146 B1 | 10/2015 | |
| WO | 2018046077 A1 | 3/2018 | |
| WO | WO-2018046077 A1 * | 3/2018 | ......... A63B 22/0023 |

\* cited by examiner

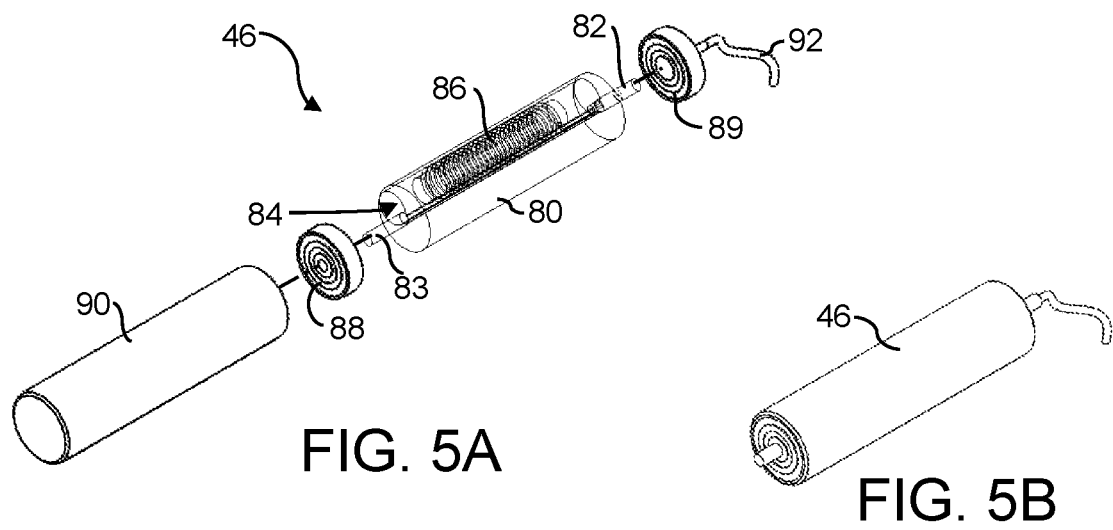
FIG. 5A
FIG. 5B
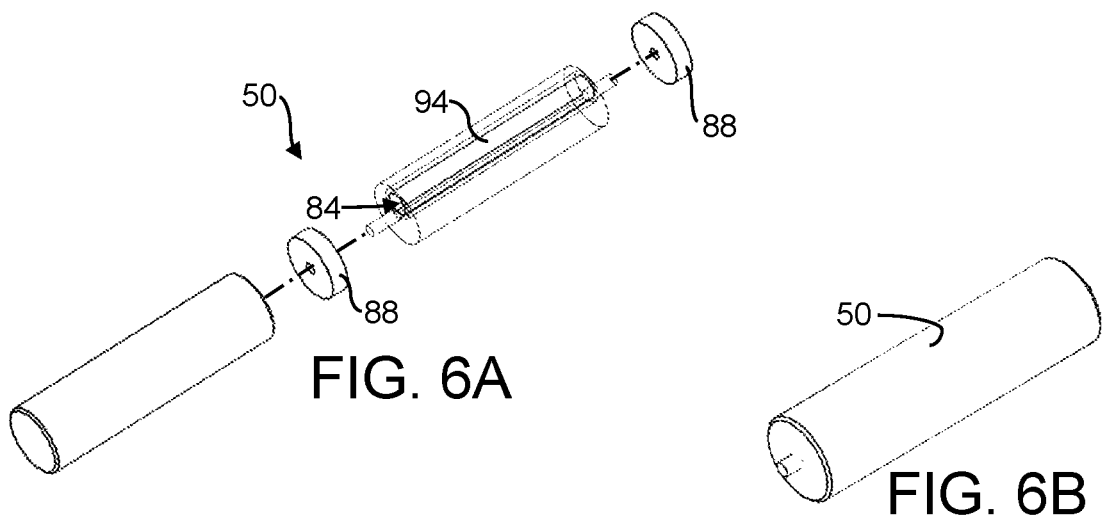
FIG. 6A
FIG. 6B
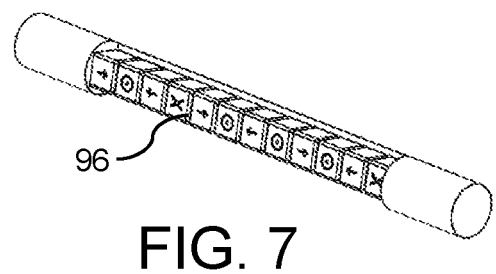
FIG. 7

MULTI-ANGLE SORTER

BACKGROUND

The invention relates generally to power-driven conveyors and in particular to conveyors for sorting articles.

The increasing demand for next-day delivery of articles such as parcels, packages, and letters requires high-throughput sorting systems to rapidly direct articles received from multiple sources to selected destinations.

SUMMARY

One version of a multi-angle sorter embodying features of the invention comprises a frame having a perimeter about a central axis, an omnidirectionally endless conveyor belt, and a roller drive. The omnidirectionally endless conveyor belt has an exterior surface and an interior surface bounding an interior of the conveyor belt. The frame is disposed in the interior. The roller drive has a plurality of roller sets arranged in pairs of diagonally opposite roller sets at different radial angles about the central axis. Each of the pairs of diagonally opposite roller sets selectively engages the conveyor belt to drive the conveyor belt over the frame at a corresponding radial angle.

In another aspect, one version of a grid sorter embodying features of the invention comprises a plurality of first conveyor lines arranged in parallel in a first direction and including series of first conveyors and a plurality of second conveyor lines arranged in parallel in a second direction transverse to the first direction and including series of second conveyors forming a first grid of the first conveyor lines intersecting the second conveyor lines at a plurality of intersections. At least some of the first and second conveyors are multi-angle sorters disposed at selected intersections. Each of the multi-angle sorters includes a frame having a perimeter about a central axis, an omnidirectionally endless conveyor belt, and a plurality of discharges. The omnidirectionally endless conveyor belt has an exterior surface and an interior surface bounding an interior of the conveyor belt. The frame is disposed in the interior. The roller drive has a plurality of roller sets arranged in pairs of diagonally opposite roller sets at different radial angles about the central axis. The discharges are adjacent at least some of the multi-angle sorters in the first and second conveyor lines to receive articles from the multi-angle sorters. Each of the pairs of diagonally opposite roller sets selectively engages the conveyor belt to drive the conveyor belt over the frame along a corresponding radial angle in the first direction, the second direction, or another direction toward one of the discharges.

BRIEF DESCRIPTION OF THE DRAWINGS

FIG. 5A is an exploded, partly phantom view of a passive roller with an electromagnet usable in the multi-angle sorter of FIG. 1, and FIG. 5B is an isometric view of the passive roller of FIG. 5A.

FIG. 6A is an exploded, partly phantom view of a pinch roller with an embedded permanent magnet or ferrous material usable in the multi-angle sorter of FIG. 1, and FIG. 6B is an isometric view of the pinch roller of FIG. 6A.

FIG. 7 is an isometric view of a Halbach magnet array for embedding in a pinch roller as in FIG. 6A.

DETAILED DESCRIPTION

Figure 1:
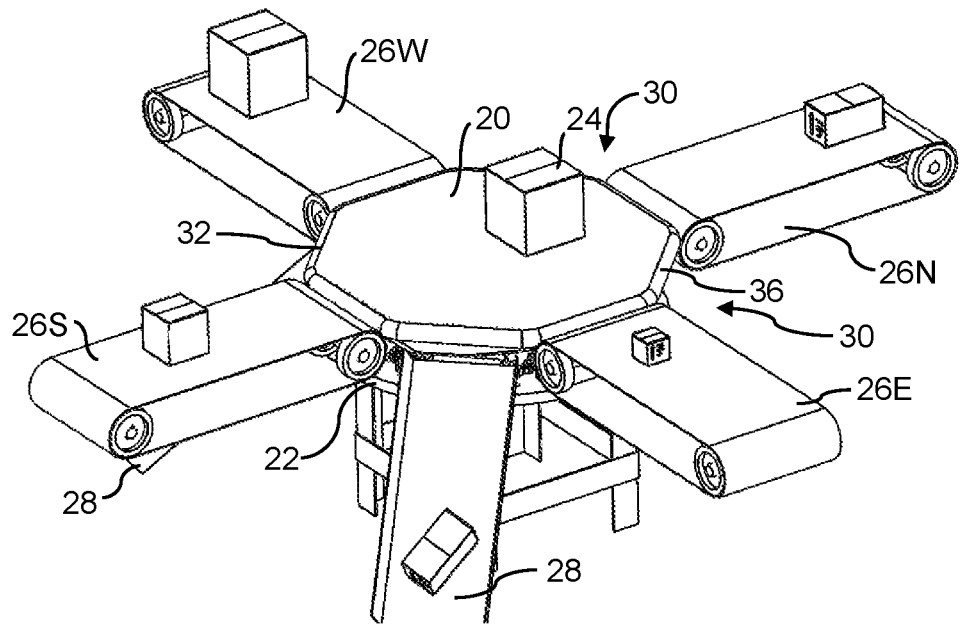
FIG. 1 is an isometric view of a multi-angle sorter embodying features of the invention used in a sorting conveyor system.
Figure 2:
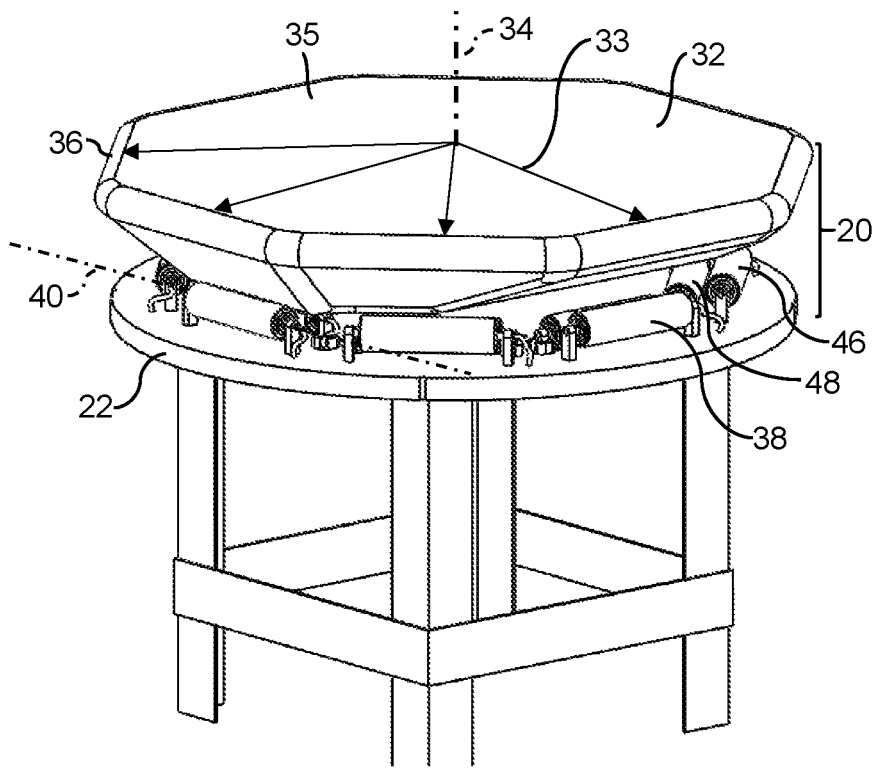
FIG. 2 is an enlarged isometric view of the multi-angle sorter of FIG. 1 seen in isolation.

A multi-angle sorter embodying features of the invention is shown in FIGS. 1 and 2. The multi-angle sorter 20 is supported on a stand 22 and feeds articles 24 to or receives articles in different directions from four conveyors 26N, 26W, 26S, 26E. Discharges, such as chute discharges 28 and drop discharges 30, are located at positions between the conveyors 26N, 26W, 26S, 26E. The articles 24 are conveyed atop an omnidirectionally endless conveyor belt 32, which can be selectively driven to convey the articles in multiple directions 33 at multiple radial angles about the central axis 34 of the multi-angle sorter 20.

The conveyor belt 32 is omnidirectionally endless in that it has no ends or edges and is continuous in all directions. A circular bean bag without the beans is one example visualization of the shape of such a belt. The conveyor belt 32 has an exterior surface 35, which serves as the conveying surface for articles, and an interior surface bounding the space forming the belt's interior. The belt 32 may be made, for example, of a durable and flexible material such as rubber or a rubber-like elastomer.

In this example the multi-angle sorter 20 is octagonal in shape with eight sides 36. The conveyor belt 32 is driven over each side 36 by a corresponding roller set 38. The eight-sided multi-angle sorter 20 has eight sets 38 of rollers. Each roller set 38 corresponds to one of the eight sides 36. The roller sets 38 are arranged around the perimeter of the multi-angle sorter 20. The axis of rotation 40 of each roller set 38 determines one of the belt's radial drive angles, or drive directions 33, which are perpendicular to the rollers' axes of rotation. Together, all the roller sets 38 compose a roller drive.

Figure 3:
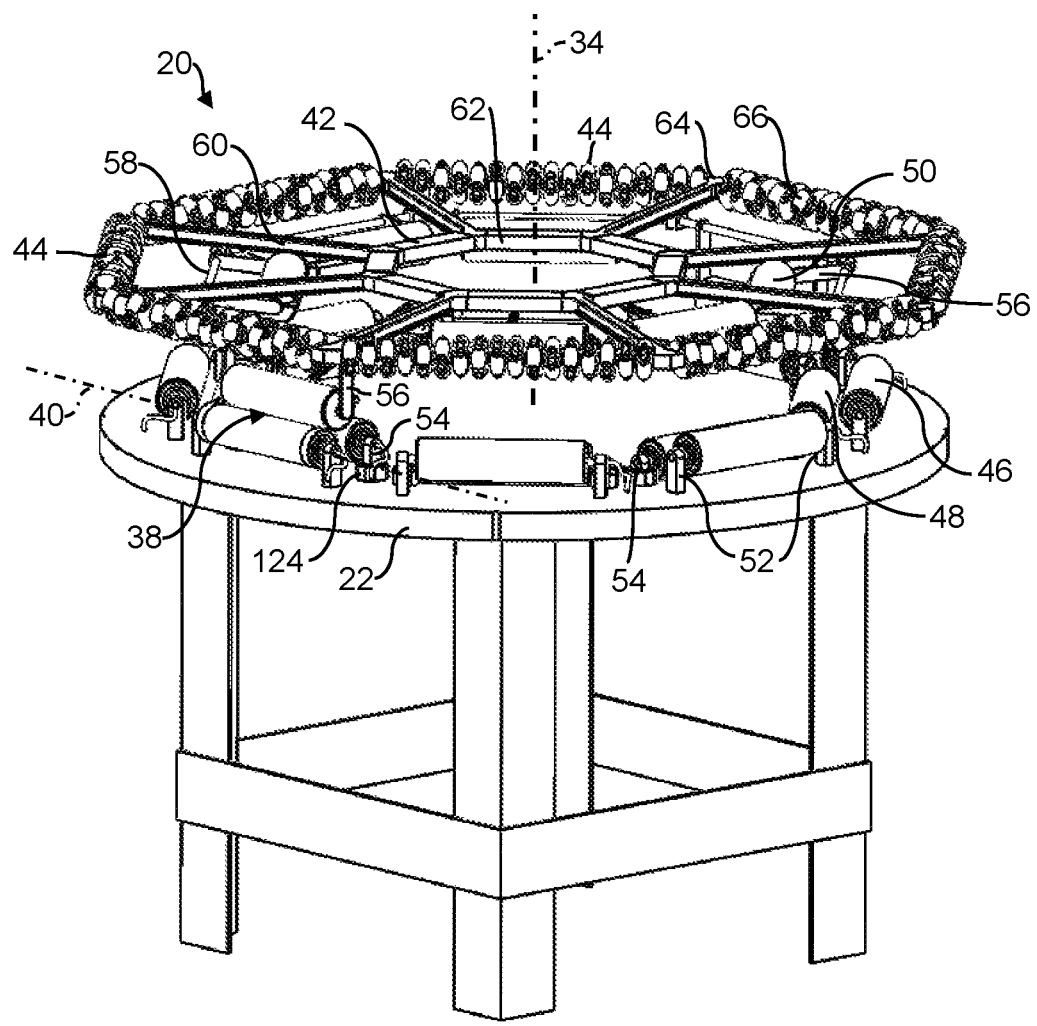
FIG. 3 is an enlarged isometric view as in FIG. 2 with the conveyor belt removed.

As shown in FIG. 3 with the conveyor belt removed, the multi-angle sorter 20 has a polygonal—in this example, octagonal—frame 42 on which the conveyor belt rides. The perimeter of the polygonal frame 42 has eight sides 44. Each side 44 is parallel to the parallel axes of rotation 40 of three rollers in each roller set 38.

Each roller set 38 includes a freely rotatable idle, or passive, roller 46 mounted to a pair of stanchions 52 at a fixed position on the stand 22. A motorized drive roller 48 is mounted radially inward of the passive roller 46 on movable stanchions 54. Actuators 124 move the stanchions 54 from a raised driving position engaging the outer surface 35 of the conveyor belt 32 to a lowered non-driving position out of contact with the conveyor belt. Both the passive and drive rollers 46, 48 are situated below the conveyor belt. The third roller in each roller set 38 is a pinch roller 50 that is supported between a pair of swing arms 56 pivotably attached to the frame 42 on a crossbar 58. The axes of rotation of all the rollers in each roller set 38 are parallel to each other. And each roller set 38 is paired with a diagonally opposite roller set on the opposite side of the central axis 34 of the frame 42 and the multi-angle sorter 20. The frame 42 includes a network of spokes 60 that fan out radially from a central polygonal hub 62. The distal ends of consecutive spokes 60 support opposite ends of shafts 64. Rotationally mounted on each shaft 64 is an array of omniwheels 66. The omniwheels 66 form the radially outer sides 44 along the perimeter of the frame 42 and serve as reversing elements for the conveyor belt. The entire carryway frame 42 with all its attachments, including the pinch rollers, resides in the interior of the omnidirectionally endless conveyor belt.

Figure 4:
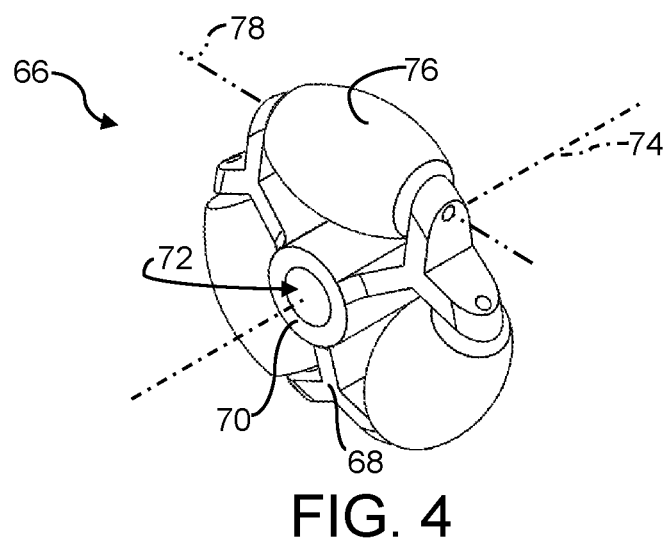
FIG. 4 is an isometric view of an omniwheel used in the multi-angle sorter of FIG. 3.

As shown in FIG. 4, the omniwheel 66 has roller supports 68 extending radially outward from a central hub 70. An axial bore 72 through the hub 72 receives the carryway shaft (64, FIG. 3) and defines the main axis of rotation 74 of the omniwheel on the fixed shaft. Peripheral rollers 76 are each rotationally mounted between consecutive roller supports 68. The peripheral rollers 76 rotate on axes 78 that are skewed transverse to the omniwheel's main axis of rotation 74. In this version of the omniwheel, the transverse axes of the three peripheral rollers 76 are coplanar in a plane perpendicular to the omniwheel's main axis 74. Thus, the omniwheels 66 provide freely rolling contact over and along the sides of the sorter to the interior surface of the conveyor belt as it reverses between its top run above the frame and its return run below the frame.

One way the omnidirectionally endless conveyor belt 32 of FIG. 2 can be installed on the frame 42 of FIG. 3 is by forming the belt from a tubular-shaped section of durable flexible material open at opposite ends. The frame 42 with its attachments is inserted into the interior of the tube through one of the ends. Then the ends are sealed by welding, gluing, or vulcanizing to produce an omnidirectionally endless belt completely surrounding the frame. The belt and belt-encased frame sit atop the passive and drive rollers 46, 48 as shown in FIG. 2.

The passive roller 46 is shown in more detail in FIGS. 5A and 5B. The roller 46 has a cylindrical stator 80 with axial shaft ends 82, 83 that are affixed to the stanchions 52 on the stand 22 as shown in FIG. 3. The stator 80 does not rotate. A radially offset axial bore 84 in the stator 80 accommodates an electromagnet 86 in the form of a solenoid or other coil. Bearings 88, 89 attached at each end of the stator 80 are affixed to an outer roller shell 90 that rotates on the bearings about the shaft ends 82, 83. Control wires 92 extend through one of the bearings 89 to supply energy to the electromagnet 86.

The pinch roller 50 shown in FIGS. 6A and 6B differs in construction from the passive roller 46 of FIG. 5A only in that the offset axial bore 84 holds a ferrous material—an iron core, for example—or a permanent magnet 94. And, because no electric power is required, neither bearing 68 has to accommodate wires. The permanent magnet 94 in the pinch roller 50 can be realized by a Halbach array 96 as shown in FIG. 7 to direct the magnetic field toward the electromagnet in the passive roller and away from other magnetic and ferrous materials in the conveyor.

Figure 8A:
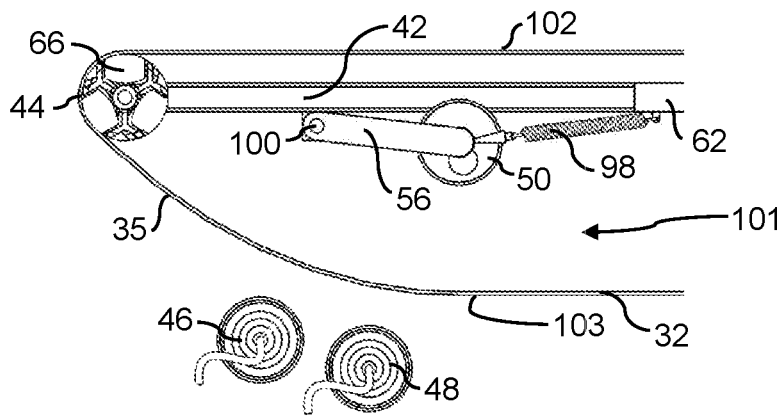
FIG. 8A is a side elevation view of one of the roller drives in the multi-angle sorter of FIG. 1 with the pinch roller in a non-pinching position and the drive roller in a non-driving position.
Figure 8B:
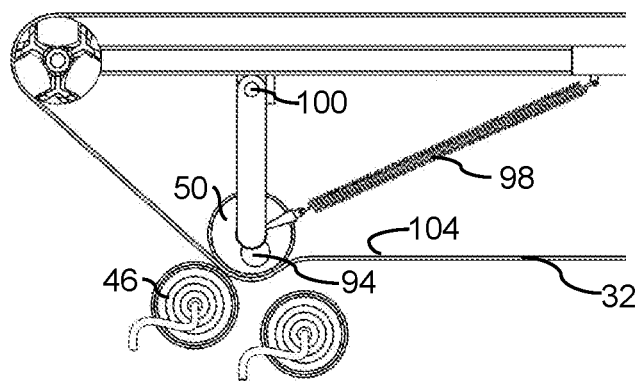
FIG. 8B shows the pinch roller in a pinching position and the drive roller in a non-driving position.
Figure 8C:
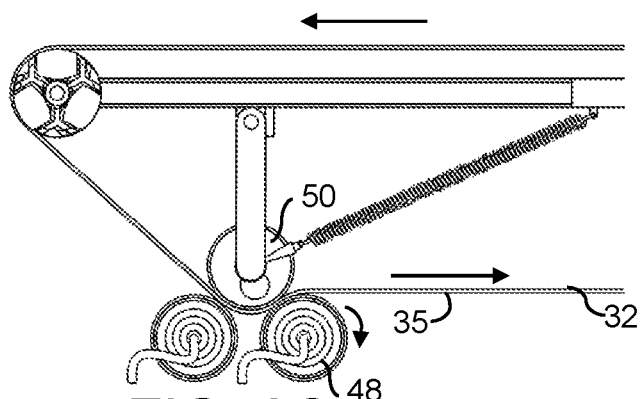
FIG. 8C shows the pinch roller in a pinching position and the drive roller in a driving position to drive the belt.

FIGS. 8A-8C show how one of the roller sets of the roller drive drives the conveyor belt 32. In FIG. 8A the drive roller 48 is shown in the non-driving position out of contact with the exterior surface 35 of the conveyor belt 32. The pinch roller 50 is shown biased in its non-pinching position by a spring 98 attached between the frame's hub 62 and the swing arms 56—all of which are in the interior 101 of the conveyor belt 32. The swing arms 56 are pivotably attached to the frame 42 by pivots 100. The conveyor belt 32 reverses from an upper conveying run 102 to a lower return run 103 about the array of omniwheels 66 at the outer side 44 of the frame 42. Depending on the amount of belt sag in the return run 103, the belt 32 may or may not rest on the passive roller 46. In FIG. 8B the pinch roller 50 is shown in its pinching position against the interior surface 104 of the conveyor belt 32. The energization of the electromagnet in the passive roller 46 attracts the magnetic element 94—permanent magnet or ferrous element—in the pinch roller 50. The attractive magnetic force causes the pinch roller 50 and its swing arms 56 to pivot about the pivots 100 into contact with the interior surface 104 to pinch the conveyor belt 32 between itself and the passive roller 46. The continued energization of the electromagnet holds the pinch roller against the belt 32 in a tight pinch against the force of the stretched spring 98. After the pinch roller 50 moves into the pinching position, the drive roller 48 moves from the non-driving position into the driving position in contact with the exterior surface 35 of the conveyor belt 32 to pinch the belt against the pinch roller 50 as shown in FIG. 8C. The drive roller 48 is then powered into rotation to drive the belt 32 in the selected direction indicated by the arrows. The pinching action during driving holds the belt-frame assembly in place. The sequence shown in FIGS. 8A-8C is reversed to stop driving the belt 32 in the selected direction.

Figure 9:
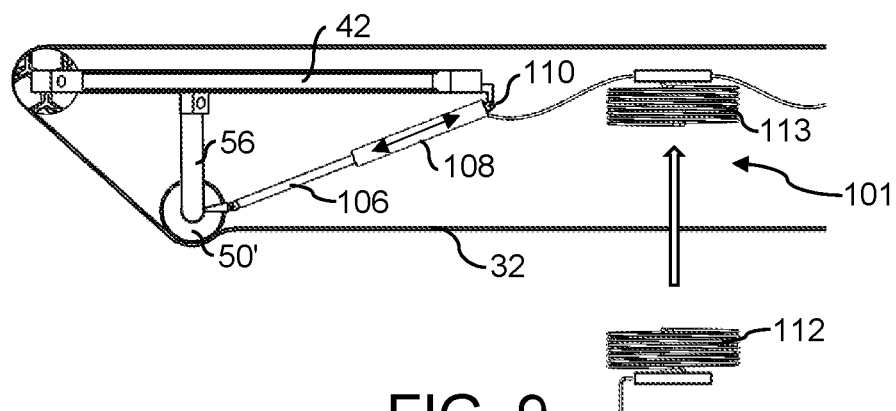
FIG. 9 is a side elevation view of pinch roller as in FIGS. 8A-C with an inductively powered actuator to move the pinch roller from the non-pinching position to the pinching position.

An alternative way to activate the pinch roller 50' is shown in FIG. 9 with the passive and drive rollers not shown. In this version the pinch roller's swing arms 56 attach to the piston rod 106 of a linear actuator 108 attached to a pivot 110 on the frame 42. The actuator 108 is energized by an inductive coupler coupling power inductively and wirelessly from an inductive-coupler primary winding 112 outside the conveyor belt 32 to an inductive-coupler secondary winding 113 mounted in the frame 42 in the interior 101 of the belt. When energized by the inductive coupler, the actuator 108 extends its piston arm 106 to pivot the swing arms 56 and the pinch roller 50' into the lowered pinching position as in FIG. 9. When not energized, the actuator 108 retracts the piston 106 to return the pinch roller 50' to its raised non-pinching position. Because the pinch roller 50' is moved by the actuator 108, a magnetic element is not required to be embedded in the roller's stator. Nor is an electromagnet in the corresponding passive roller required to move the pinch roller 50'. But the electromagnet in the passive roller and the magnetic element in the pinch roller 50' could be used to help maintain a tight pinch when the pinch roller is in the pinching position.

Figure 10:
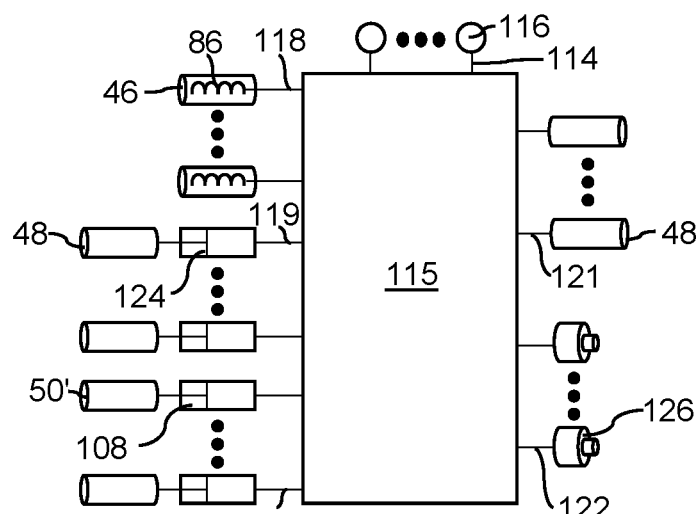
FIG. 10 is a block diagram of a control system for a sorting system using a multi-angle sorter as in FIG. 1.

The operation of the multi-angle sorter is controlled by a controller 115 as shown in FIG. 10. The controller 115 can be a programmable logic controller or any programmable computer capable of executing program instructions to receive input signals 114 from sensors 116 and output command signals 118, 119, 120, 121, 122 to activate and de-activate external devices. With these signals the controller 115 controls the electromagnets 86 in the passive rollers 46, the actuators 124 for the movable stanchions supporting the drive rollers 48, the optional linear actuators 108 for the pinch rollers 50', the drive rollers 48, and motors 126 for other conveyors associated with the multi-angle sorter.

Figure 11:
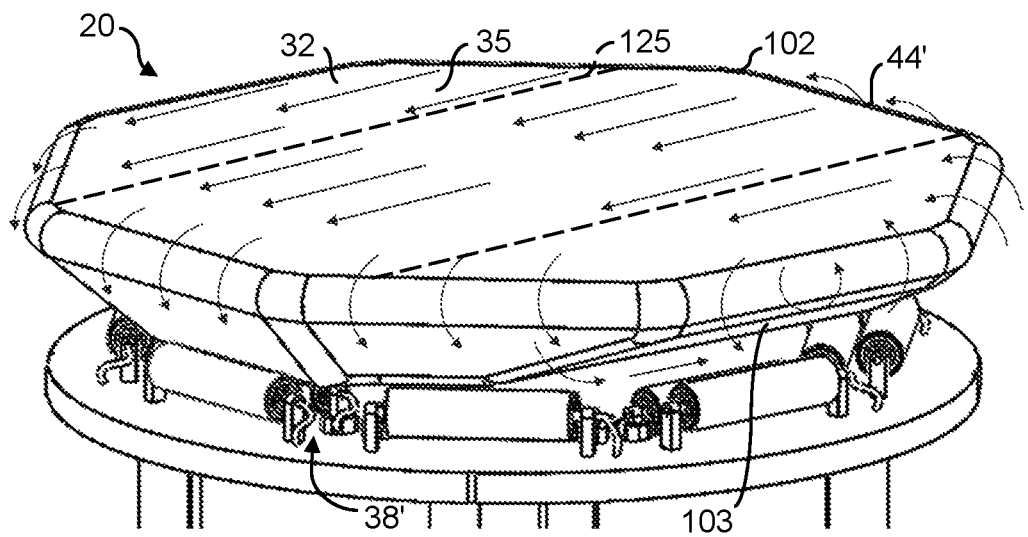
FIG. 11 is an enlarged view of the multi-angle sorter of FIG. 1 showing belt flow.

FIG. 11 illustrates how the omnidirectionally endless conveyor belt 32 in the multi-angle sorter 20 moves. In this example the conveyor belt 32, shown moving at a radial angle in the direction indicated by the arrows, is propelled by the roller set 38' whose pinch roller is in the pinching position and whose drive roller is in the driving position. At the same time the roller set below the diagonally opposite side 44' is also activated in the pinching and driving positions to maintain the exterior surface 35 of the belt taut at least along a belt strip 125 between the two activated diagonally opposite roller sets. Meanwhile, all the other roller sets are de-activated. The portions of the belt 32 outside the strip 125 may experience some billowing. And any tendency of the belt to jam is prevented by the rotational freedom of the omniwheels at the transitions from the upper run 102 to the lower return run 103.

Because the frame resides entirely in the interior of the omnidirectionally endless conveyor belt, the belt-frame assembly is supported at all times by at least one pair of diagonally opposite roller sets. In particular, at least one pair of diagonally opposite pinch rollers must be in the pinching position at all times. So when the multi-angle sorter is being switched from one radial sort angle to another, the pair of diagonally opposite pinch rollers corresponding to the first radial sort angle must remain in the pinching position until the pair of diagonally opposite pinch rollers corresponding to the new radial sort angle is moved into the pinching position. Once that happens, the pinch rollers corresponding to the first sort angle can be moved to the non-pinching position. In other words, the pinch rollers are operated in a make-before-break manner to maintain the belt-frame assembly in plane.

Figure 12A:
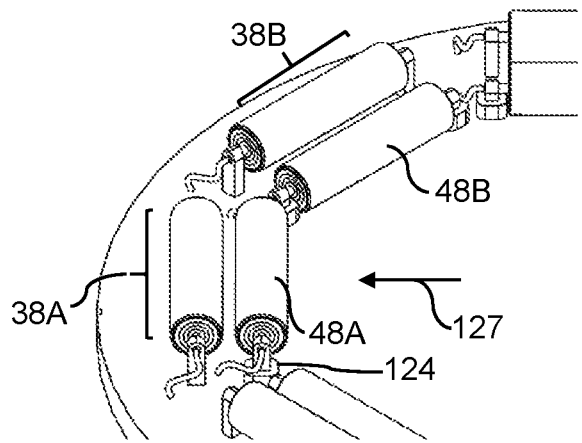
FIG. 12A-12C are sequential views showing the transition from one conveying direction to an adjacent conveying direction in a multi-angle sorter as in FIG. 1.
Figure 12B:
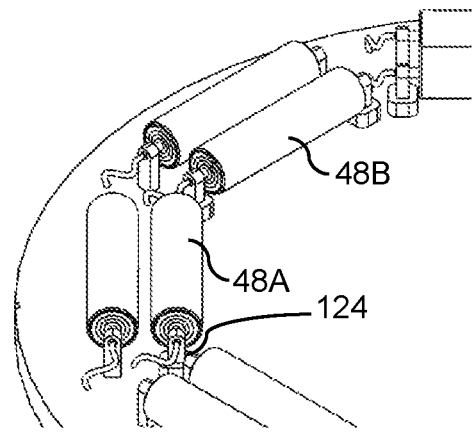
Figure 12C:
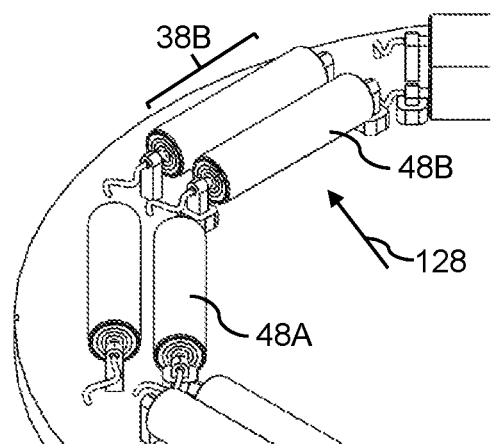

FIGS. 12A-12C illustrate the make-before-break operational sequence followed by the roller sets in changing from one radial sort angle to another. In FIG. 12A, the drive roller 48A of the roller set 38A is shown raised by the actuators 124 to the raised driving position during which the corresponding pinch roller (not shown) is in the pinching position along with its diagonally opposite roller set (not shown) to support the belt-frame assembly (not shown) and drive the belt at a radial sort angle in a direction 127 perpendicular to the axes of the rollers in the roller set 38A. The drive roller 48B in the adjacent roller set 38B is de-activated by the actuators 124 to the lowered non-driving position, and its corresponding pinch roller (not shown) is in the retracted non-pinching position. FIG. 12C shows the positions of the drive rollers 48A, 48B when the belt is driven at a different radial sort angle in a different direction 128. When the belt is driven in the direction 128 perpendicular to the axes of the rollers in the second roller set 38B, its drive roller 48B is in the raised driving position along with its pinch roller (not shown) in the extended pinching position. And the previously raised drive roller 48A is in its lowered non-driving position. FIG. 12B shows the make-before-break operation in changing conveying directions from the angular direction 127 in FIG. 12A to the angular direction 128 in FIG. 12C. Before the drive roller 48A is lowered to the non-driving position in FIG. 12C, the drive roller 48B is raised to the driving position. As FIG. 12B shows, both drive rollers 48A, 48B are simultaneously in the driving position. But that state persists only for an instant before the drive roller 48A is lowered.

Figure 13:
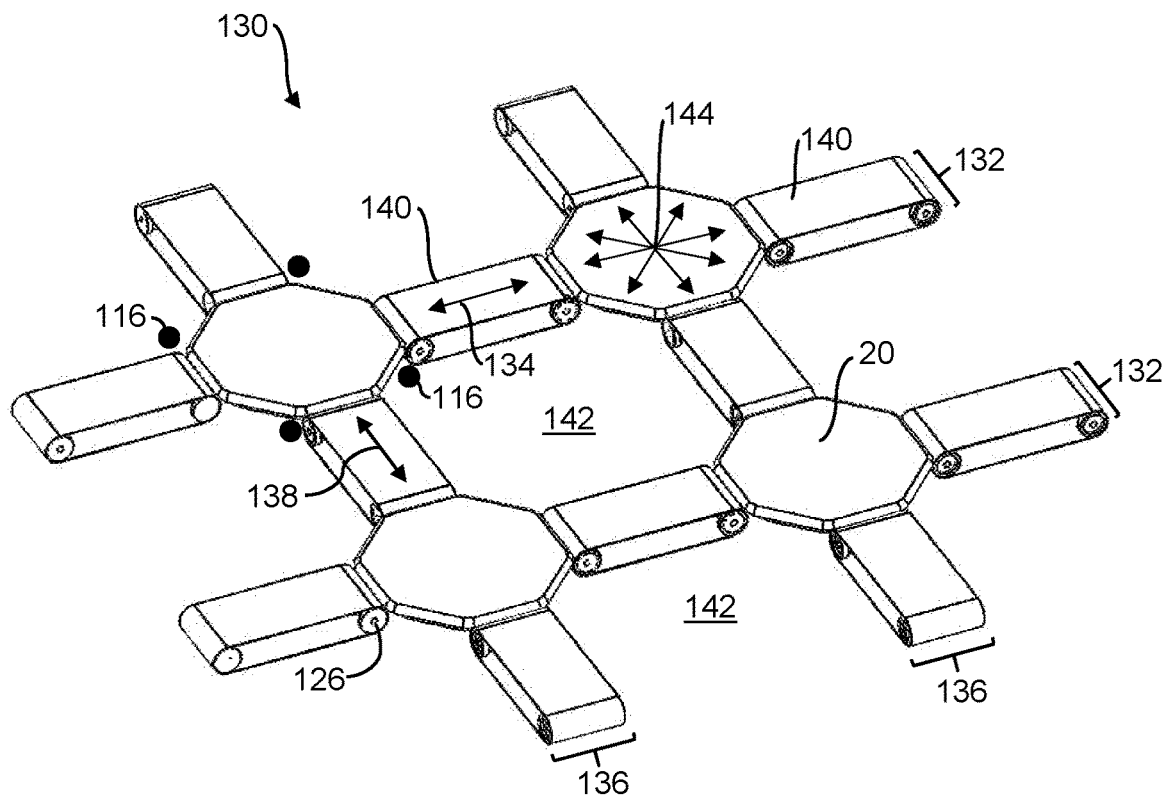
FIG. 13 is an isometric view of a portion of a grid sorter using multi-angle sorters as in FIG. 1.

The multi-angle sorter 20 is usable in a grid sorter 130 as shown in FIG. 13. The grid sorter 130 has a plurality of first conveyor lines 132 arranged in parallel in a first direction 134 and a plurality of second conveyor lines 136 arranged in parallel in a second direction 138 transverse to the first direction. In this example, the first and second directions 134, 138 are perpendicular to each other. But they could be oblique at 45° to each other with the octagonal multi-angle sorter 20 shown. And, of course, more than two first and second conveyor lines 132, 136 could be constructed by continuing the pattern. The first and second conveyor lines 132, 136 each include a series of multi-angle sorters 20 in line with belt conveyors 140 driven by motors 126. The first and second conveyor lines 132, 136 intersect to form a grid. The multi-angle sorters 20 are positioned at the intersections. The conveyors 140 between the multi-angle sorters 20 are bidirectional conveyors. The conveyors at the ends of each conveyor line 132, 136 may be unidirectional for feeding articles only into the grid sorter 20. Discharges 142 adjacent the multi-angle sorters 20 and the conveyor lines 132, 136 receive articles directed from the multi-angle sorters along directions oblique to the first and second directions. In the case of the octagonal multi-angle sorter 20 shown in FIG. 13, the sorter can selectively move articles at any one of eight radial angles 144. Four of the angles keep an article on one or the other of the conveying lines 132, 136, and the other four direct the article obliquely to a discharge 142. Position sensors 116 disposed at various positions throughout the grid sorter 130 detect the presence or absence of articles at positions on the grid and send corresponding signals to the controller, which acts as a traffic cop to prevent collisions while directing articles to their discharge destinations along efficient paths.

Figure 14:
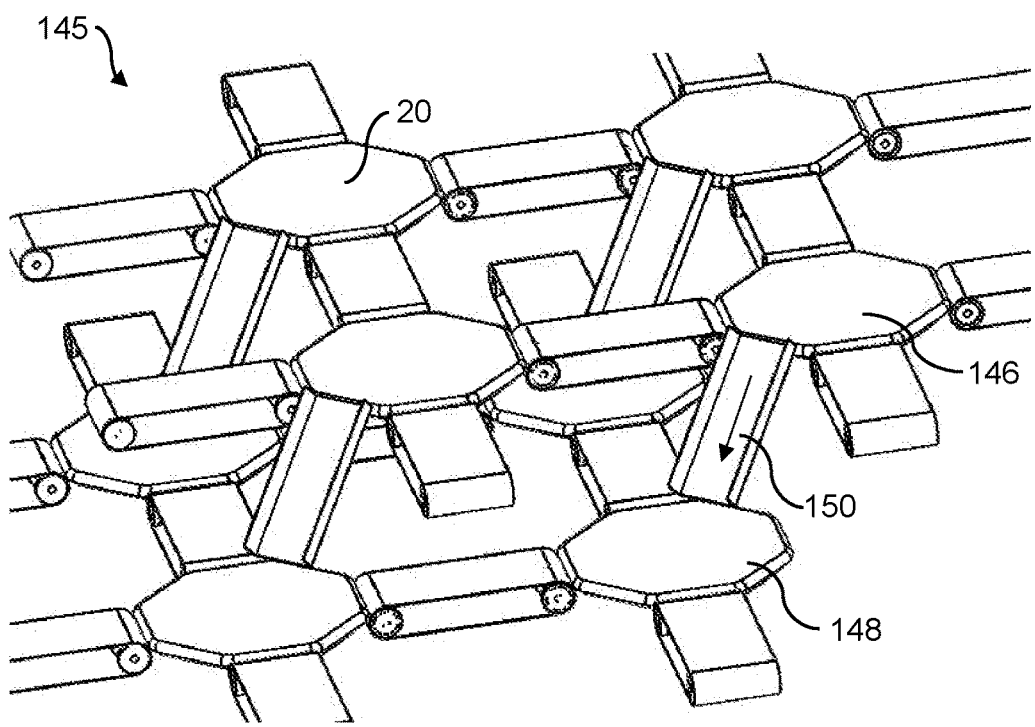
FIG. 14 is an isometric view of a portion of a two-level grid sorter as in FIG. 13.

FIG. 14 shows a three-dimensional, multi-level grid sorter 145 made up of an upper-level grid sorter 146 and a lower-level grid sorter 148. Of course, more levels are possible. At least some of the discharges from the multi-angle sorters 20 on the upper level 146 are chutes 150 down which articles discharged from the upper level slide to multi-angle sorters on the lower level 148. Others of the discharges on the upper level could represent final destinations.

Although the invention has been described in detail through exemplary versions, other versions are possible. For example, the multi-angle sorter is described as octagonal with eight angular radial conveyor directions, but it could have fewer or more than eight selectable angles. As another example, the motorized drive rollers can be rollers driven by internal or external motors. The belt conveyors shown in the grid sorters of FIGS. 13 and 14 could be replaced by other kinds of conveyors, such as powered roller conveyors. And the drive rollers in diagonally opposite roller sets can be driven together at the same speed, or the drive roller at the transition from the lower run to the upper run could be stopped or driven at a lower speed than the other drive roller in the other set to maintain some tension to keep the upper conveying surface of the belt taut along the conveying strip. So, as these few examples suggest, the scope of the claims is not meant to be limited to the versions used to help describe the invention.

What is claimed is:

1. A multi-angle sorter comprising:
a frame having a perimeter about a central axis;

an omnidirectionally endless conveyor belt having an exterior surface and an interior surface bounding an interior of the conveyor belt, wherein the frame is disposed in the interior;

a roller drive having a plurality of roller sets arranged in pairs of diagonally opposite roller sets at different radial angles about the central axis, wherein each of the pairs of diagonally opposite roller sets selectively engages the conveyor belt to drive the conveyor belt over the frame at a corresponding radial angle;

wherein each of the roller sets includes a first roller and a second roller that are situated external to and below the conveyor belt.

2. A multi-angle sorter as claimed in claim 1 wherein the perimeter of the frame is polygonal with an even number of radially outer sides and wherein the multi-angle sorter comprises a shaft mounted to the frame along each radially outer side and a plurality of omniwheels mounted on each shaft in rolling contact with the interior surface of the conveyor belt.

3. A multi-angle sorter as claimed in claim 1 wherein each of the roller sets includes:
a passive roller as the first roller situated at a fixed position below the conveyor belt;
a powered drive roller as the second roller situated below the conveyor belt and movable from a driving position in contact with the exterior surface of the conveyor belt to a non-driving position out of contact with the conveyor belt;
a pinch roller attached to the frame in the interior of the conveyor belt and movable from a pinching position against the interior surface pinching the conveyor belt between itself and the passive roller contacting the exterior surface and the drive roller in the driving position and a non-pinching position out of contact with the interior surface of the conveyor belt.

4. A multi-angle sorter as claimed in claim 3 wherein the passive roller, the drive roller, and the pinch roller rotate on axes perpendicular to the direction of the corresponding radial angle.

5. A multi-angle sorter as claimed in claim 3 wherein the passive roller is radially farther from the central axis of the frame than is the powered drive roller.

6. A multi-angle sorter as claimed in claim 3 wherein the pinch roller includes a permanent magnet or ferrous material and the passive roller includes an electromagnet selectively energized to attract the permanent magnet or magnetic material in the pinch roller to move the pinch roller from the non-pinching position to the pinching position or to maintain a tight pinch of the conveyor belt between the passive roller and the pinch roller when the pinch roller is in the pinching position.

7. A multi-angle sorter as claimed in claim 6 wherein the permanent magnet is a Halbach array.

8. A multi-angle sorter as claimed in claim 3 wherein the powered drive roller is a motorized roller.

9. A multi-angle sorter as claimed in claim 3 wherein each of the roller sets includes a spring biasing the pinch roller toward the non-pinching position.

10. A multi-angle sorter as claimed in claim 3 wherein each of the roller sets includes:
an actuator supported in the interior of the conveyor belt by the frame and mechanically coupled to the pinch roller;
an inductive-coupler primary winding external to the conveyor belt;
an inductive-coupler secondary winding in the interior of the conveyor belt connected to the actuator and inductively coupled to the inductive-coupler primary winding to transfer power wirelessly to the actuator to move the pinch roller between the pinching and non-pinching positions.

11. A multi-angle sorter as claimed in claim 3 wherein the pinch rollers of at least one pair of the diametrically opposite roller sets are in the pinching position at all times to support the frame and the conveyor belt.

12. A multi-angle sorter as claimed in claim 1 comprising a controller controlling the roller drive to drive the conveyor belt at a selected radial angle over the frame.

13. A multi-angle sorter as in claim 1 wherein the omnidirectionally endless conveyor belt is formed of a rubber or rubber-like material sealed by welding, gluing, or vulcanizing.

14. A grid sorter comprising:
a plurality of first conveyor lines arranged in parallel in a first direction and including series of first conveyors;
a plurality of second conveyor lines arranged in parallel in a second direction transverse to the first direction and including series of second conveyors forming a first grid of the first conveyor lines intersecting the second conveyor lines at a plurality of intersections;
wherein at least some of the first and second conveyors are multi-angle sorters disposed at selected intersections, each of the multi-angle sorters including:
a frame having a perimeter about a central axis;
an omnidirectionally endless conveyor belt having an exterior surface and an interior surface bounding an interior of the conveyor belt, wherein the frame is disposed in the interior;
a roller drive having a plurality of roller sets arranged in pairs of diagonally opposite roller sets at different radial angles about the central axis;
wherein each of the roller sets includes a first roller and a second roller that are situated external to and below the conveyor belt;
a plurality of discharges adjacent at least some of the multi-angle sorters in the first and second conveyor lines to receive articles from the multi-angle sorters;
wherein each of the pairs of diagonally opposite roller sets selectively engages the conveyor belt to drive the conveyor belt over the frame along a corresponding radial angle in the first direction, the second direction, or another direction toward one of the discharges.

15. A grid sorter as in claim 14 wherein the multi-angle sorters are octagonal to selectively move articles at one of eight radial angles.

16. A grid sorter as claimed in claim 14 comprising a controller controlling the roller drive to drive the conveyor belt at a selected radial angle over the frame.

17. A grid sorter as claimed in claim 14 wherein each of the roller sets includes:
a passive roller as the first roller situated at a fixed position below the conveyor belt;
a powered drive roller as the second roller situated below the conveyor belt and movable from a driving position in contact with the exterior surface of the conveyor belt to a non-driving position out of contact with the conveyor belt;
a pinch roller attached to the frame in the interior of the conveyor belt and movable from a pinching position against the interior surface pinching the conveyor belt between itself and the passive roller contacting the exterior surface and the drive roller in the driving position and a non-pinching position out of contact with the interior surface of the conveyor belt.

18. A multi-angle sorter as claimed in claim 17 wherein the pinch rollers of at least one pair of the diametrically opposite roller sets are in the pinching position at all times to support the frame and the conveyor belt.

19. A grid sorter comprising:
a plurality of first conveyor lines arranged in parallel in a first direction and including series of first conveyors;
a plurality of second conveyor lines arranged in parallel in a second direction transverse to the first direction and including series of second conveyors forming a first grid of the first conveyor lines intersecting the second conveyor lines at a plurality of intersections;
wherein at least some of the first and second conveyors are multi-angle sorters disposed at selected intersections, each of the multi-angle sorters including:
a frame having a perimeter about a central axis;
an omnidirectionally endless conveyor belt having an exterior surface and an interior surface bounding an interior of the conveyor belt, wherein the frame is disposed in the interior;
a roller drive having a plurality of roller sets arranged in pairs of diagonally opposite roller sets at different radial angles about the central axis;
a plurality of discharges adjacent at least some of the multi-angle sorters in the first and second conveyor lines to receive articles from the multi-angle sorters;
wherein each of the pairs of diagonally opposite roller sets selectively engages the conveyor belt to drive the conveyor belt over the frame along a corresponding radial angle in the first direction, the second direction, or another direction toward one of the discharges;
a plurality of third and fourth conveyor lines forming a like second grid of the third and fourth conveyor lines intersecting at a plurality of intersections, wherein the second grid forms a grid-sorter level below the first grid and wherein at least some of the discharges in the first grid discharge articles to the third or fourth conveyor lines in the second grid.

20. A grid sorter as claimed in claim 19 wherein at least some of the discharges in the first grid discharge articles to the multi-angle sorters at the intersections of the third and fourth conveyor lines in the second grid.

* * * * *